C. G. RICHARDSON.
MEASURING MACHINE.
APPLICATION FILED MAY 14, 1915.
1,304,603.
Patented May 27, 1919.
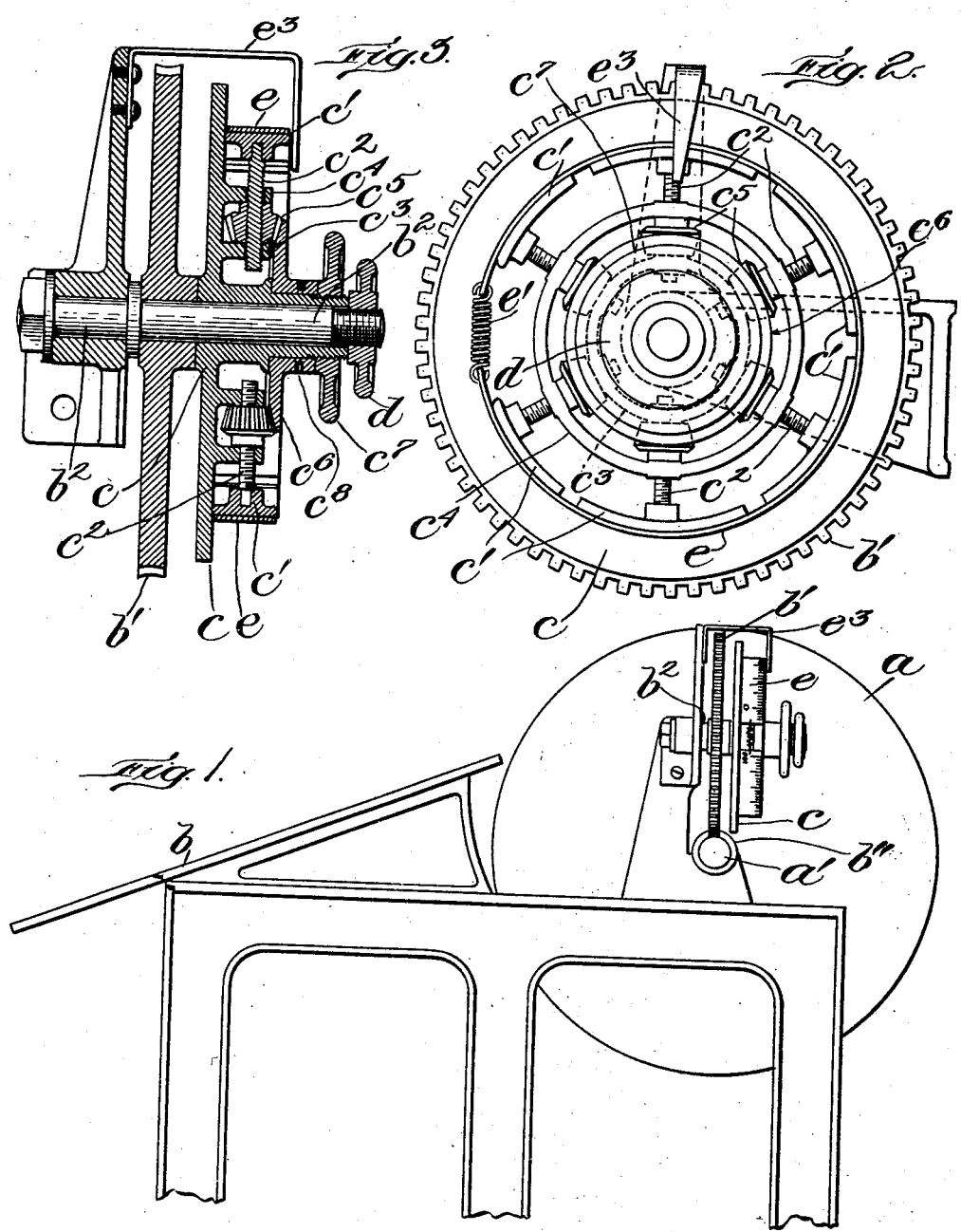
Inventor:
C. G. Richardson
by
Geo. N. Goddard, Atty.

UNITED STATES PATENT OFFICE.

CHARLES G. RICHARDSON, OF SPRINGFIELD, VERMONT.

MEASURING-MACHINE.

1,304,603.    Specification of Letters Patent.    Patented May 27, 1919.

Application filed May 14, 1915. Serial No. 28,098.

*To all whom it may concern:*

Be it known that I, CHARLES G. RICHARDSON, citizen of the United States, and resident of Springfield, county of Windsor, State of Vermont, have invented certain new and useful Improvements in Measuring-Machines, of which the following is a specification.

This invention relates to measuring machines, and is shown and described herein particularly as applied to a well-known type of machine for measuring cloth, in which is employed a rotary cloth-engaging cylinder over which the cloth is drawn and whose revolutions are registered to indicate the yardage of the cloth measured. A type of such machine is illustrated in the United States Patent No. 883,669, granted to me March 31, 1908.

In actual practice, it is found that cloth measuring machines will give varying measurements of different kinds of cloth owing, partly, to the slip of the cloth on the surface of the measuring drum, and owing, partly, to the stretch of the cloth as it is being drawn over the measuring drum, since there is considerable variation in the smoothness in the surface in different kinds of cloth, as well as in the degree of stretch to which different kinds of cloth are subject in handling. The usual practice, heretofore, has been to provide for such variations by making the measuring drum itself expansible, or contractible, or by the use of a belt running over an expansible pulley which drives the registering mechanism.

It is the object of the present invention to obviate the necessity of making the cylinder, or measuring drum, expansible and, also, to avoid the use of an expansible pulley belt drive for the registering mechanism, which, obviously, is more or less subject to slipping.

The present invention consists, generally speaking, in the combination of a measuring drum, or cylinder, and of a graduated dial, or scale, positively connected with the cloth measuring drum to be driven thereby, said scale, or dial, being itself adjustable to compensate for variations in the measurement of cloth of different kinds.

In the accompanying drawings, I have illustrated a simple and convenient form of embodying the principles of this invention, in which—

Figure 1 is a side elevation of an ordinary cloth measuring machine equipped with the compensated register, or dial.

Fig. 2 is a detailed view showing a side elevation of the dial wheel mechanism.

Fig. 3 is a vertical central section of the dial wheel mechanism on a plane at right angles to the plane of Fig. 2.

In the practice of the invention according to the form illustrated, the cloth measuring cylinder, or drum, $a$ is mounted in a suitable framework adjacent to the inclined feed table $b$. On the end of the drum-shaft $a'$ is secured a worm $b''$ which engages a worm-gear $b'$, which is keyed to a short stud-shaft $b^2$.

On the outer end of the stud-shaft $b^2$ is placed a dial supporting wheel which comprises a wheel $c$, having a contractible and expansible spider formed of supporting segments $c'$ which rest against the face of the wheel $c$ and are supported respectively by individual radial adjusting screws, or members, $c^2$, which are supported in concentric-bearing flanges $c^3$, $c^4$ projecting laterally from the face of the wheel $c$. These radial screws, or members, have screw-threaded engagement with internally threaded bevel gears $c^5$, whose rotation in one direction causes the segment supporting rods $c^2$ to move outwardly, and whose rotation in the opposite direction causes them to move inwardly by reason of the thrust engagement of the bevel gear $c^5$ with the retaining flanges $c^3$, $c^4$. The bevel gears $c^5$ are engaged by a single bevel gear $c^6$ which is adjustably clamped on the hub of the wheel $c$ by means of the internally threaded hand wheel $c^7$ which forms a clamping nut to clamp the adjusting gear $c^6$ in fixed relationship to the wheel $c$. The hub of the gear $c^6$ is provided with a hole $c^8$ for engagement of a spanner wrench when setting the dial.

The wheel $c$ is itself adjustably clamped into positive and fixed relationship with the stud-shaft $b^2$ through the agency of a hand wheel, or nut, $d$, which screws on the outer threaded end of the shaft $b^2$ into firm engagement with the end of the hub of wheel $c$.

A flexible strip $e$ of metal, or other suitable material is marked off in graduations, preferably running from zero to one hundred to form a dial, or scale, to register measurements of the cloth. This scale member is supported concentrically with the shaft $b^2$ by being passed around the supporting segments $c'$ and having its ends drawn together by any suitable device, such as a contractile spring $e'$. A fixed pointer, or finger, $e^3$ is screwed to a stationary part of the machine and extends down close to the dial, or scale $e$.

The relations of the worm gearing and of the dial are such as to make one yard on the periphery of the cloth measuring drum $a$ equivalent to one interval on the scale; that is, if the cloth measuring drums have a circumference of two yards, each revolution of the cloth drum will register two intervals corresponding to two yards on the graduated scale.

The device is used in the following manner:

A piece of the goods, such as is being handled in the particular mill, is carefully measured on the five-yard table, or otherwise, and is then passed over the measuring machine drum in the usual way to ascertain the measurement indicated by the machine. If the goods are very stretchy or distensible, the machine may indicate more yardage than the true measurement. In that case, the adjusting wheel, or nut, $c^7$ is loosened, and the bevel gear $c^6$ is turned to expand the segments $c'$ which supported the scale, or dial, sufficiently to compensate for the inaccuracy, and when the correct adjustment is reached, the wheel, or nut, $c^7$ clamps the miter gear $c^6$ firmly to the hub of the wheel $c$. The effect of expanding the scale supporting segment is to cause the scale and each subdivision thereof to subtend a small angular part of the circumference, which means that the same interval on the scale will correspond to a small angular advance in relation to the fixed pointer $e^3$. In case it is found that the measurement of any kind of cloth as indicated by the dial is less than the true measurement, the dial supporting segment may be contracted until the proper adjustment is reached. The contractile spring $e'$ serves to keep the dial always in close contact with its supporting segment.

In order to bring the dial to the zero point when starting to measure the cloth, the nut $d$ may be slackened to allow the dial carrying wheel $c$ to be turned independently of the shaft until the zero point of the dial is opposite the pointer, after which the clamping wheel is turned up to fastening position.

It would be obvious that any suitable mechanical device may be employed for supporting the dial, or scale in adjustable relationship to secure the desired relationship between the angular advance of the cloth drum and the angular advance of the dial. It would be observed, moreover, that the driving connection between the dial register and the cloth measuring drum is a positive one, entirely avoiding the possibility of slipping while affording a very accessible and convenient means of quick adjustment to compensate for variations in the nature of the cloth to be measured.

It will be seen that the flexible scale, or dial member forms in effect an expansible and contractible rim, whose spaces, or intervals corresponding to the yardage of travel of the cloth drum may be caused to subtend a greater or less arc of its own revolution by the simple expedient of expanding or contracting the segmental spider which supports it at a variable distance from its axial center. Since there is no lost motion or slip in the intermediate connections between the cloth drum and the revolving dial or scale, there is no possibility of error after the dial has been properly adjusted for any given kind of cloth to be measured.

Cuts of cloth as used in the mill will commonly vary from 30 to 40 yards in length to 90 or 100 yards. The diameter of the cloth-engaging or measuring drum commonly employed is two yards. Suppose the scale or dial to be adjusted to a point where 20 complete revolutions of the cloth drum indicates on the measuring scale or dial a measurement of 40 yards, which would be an accurate measurement. Now suppose that a more stretchy or distensible grade of cloth is to be measured. We shall then find that the pull or tension exerted by the cloth drum on the scale will so stretch the cloth in the measuring operation that it may require, let us say for example, $20\frac{1}{2}$ revolutions of the cloth drum in feeding the cloth over the drum. In such case the scale or dial would, of course, indicate a measurement of 41 yards, one yard of which is due to the stretch of the cloth. To offset such stretch the operator will contract the dial or scale until the whole scale or dial as well as its individual yard graduated intervals or sub-divisions subtend a correspondingly larger angle at the center. In other words to offset the greater total arc of revolution of the dial-supporting wheel the dial is brought nearer to the center so that the entire scale and its sub-divisions will require a larger arc of revolution to cause any sub-division or number of sub-divisions on the scale to pass by a fixed point. The opposite effect of course would be produced by expanding the dial or scale so that the entire dial or scale as well as its individual sub-divisions on being removed farther from the center will subtend smaller angles at the center.

What I claim is:

1. In a cloth measuring machine the combination with a revolving cloth drum of a dial or measuring wheel operatively connected therewith and rotated thereby, the rim of said measuring wheel comprising a graduated scale which is adjustable nearer to or farther from the axis of said wheel to cause all graduations or divisions of said scale to subtend a smaller or a larger arc thereof, substantially as described.

2. A cloth measuring machine embracing in combination a rotatable cloth-engaging drum and a graduated annular scale member operatively connected with the cloth drum to be rotated in co-ordination therewith, said scale being adjustable nearer to or farther from its central axis to cause corresponding variations in the measurements indicated by its rotation through a given graduated interval on the scale, substantially as described.

3. In a cloth-measuring machine the combination with a rotary cloth-engaging drum, a dial wheel rotatably mounted on the machine, and intermediate gearing forming a positive and driving connection between said dial wheel and said drum, said dial wheel being circumferentially adjustable in relation to said driving gearing, and an annular collapsible and expansible graduated dial adjustably supported on said dial wheel so as to be movable nearer to, or farther from, its central axis in order to vary the measurement indicated thereon for any given angle of rotation.

4. In a cloth measuring machine the combination of a rotary cloth-engaging drum, a rotatable dial-supporting wheel, a driving gear operatively connected with said drum, means for adjustably securing said dial-supporting wheel to said gear for circumferential adjustment, a contractible and expansible graduated dial mounted concentrically on said wheel, and means for adjustably supporting said dial nearer to or farther from the axial center of said wheel to vary the relation of its indicated measurements to the actual arc of revolution of said wheel, substantially as described.

5. In a cloth measuring machine the combination of a revolving cloth drum and fixed pointer, a rotatable circularly arranged dial member and intermediate connections between the cloth drum and the dial member causing said dial to rotate adjacent to said pointer, means for contracting or expanding the dial member toward or away from the center to vary the arc of its rotation in relation to the given movement of the cloth drum, substantially as described.

6. In a machine of the class described, the combination of a revoluble cloth-engaging measuring drum, an annular dial member provided with circumferential graduations or scale intervals and operatively connected with said revolving drum to be rotated in a predetermined relationship thereto, said annular dial being expansible to vary its radial distance from its center, and means for expanding said dial member whereby the graduated intervals on said dial are caused to subtend a greater or less angle about its center of rotation, substantially as described.

In witness whereof I have subscribed the above specification.

CHARLES G. RICHARDSON.

In the presence of—
 BLANCHE L. NORTON,
 ANNIE BEATRICE BURKE.

Copies of this patent may be obtained for five cents each, by addressing the "Commissioner of Patents, Washington, D. C."